May 11, 1954     M. DEN HERTOG     2,678,354

AUTOMATIC TELECOMMUNICATION EXCHANGE SYSTEM

Filed Jan. 13, 1951     9 Sheets-Sheet 2

Inventor
MARTINUS DEN HERTOG
By Robert Harding Jr.
Attorney

May 11, 1954   M. DEN HERTOG   2,678,354
AUTOMATIC TELECOMMUNICATION EXCHANGE SYSTEM
Filed Jan. 13, 1951   9 Sheets-Sheet 3

Inventor
MARTINUS DEN HERTOG
By Robert Harding Jr.
Attorney

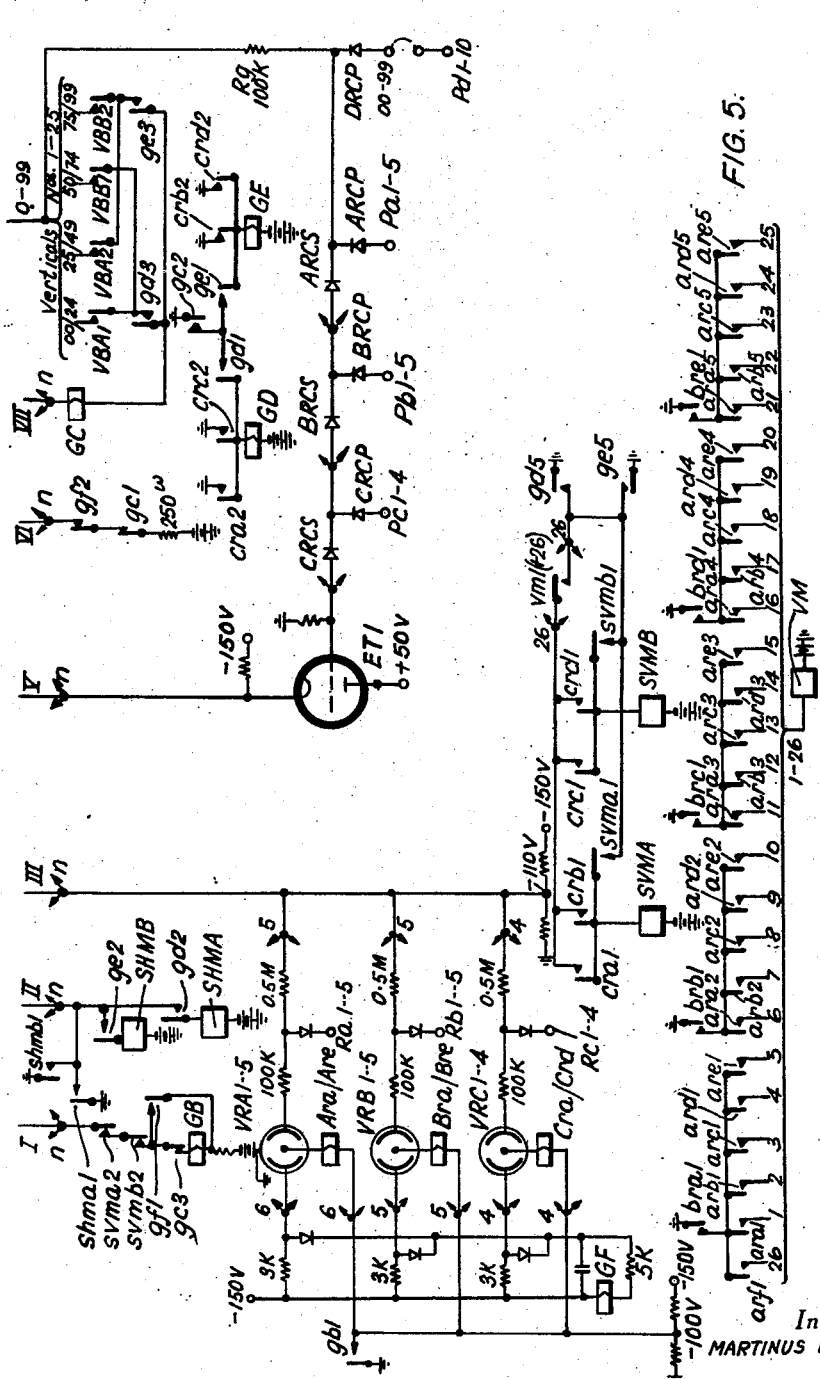

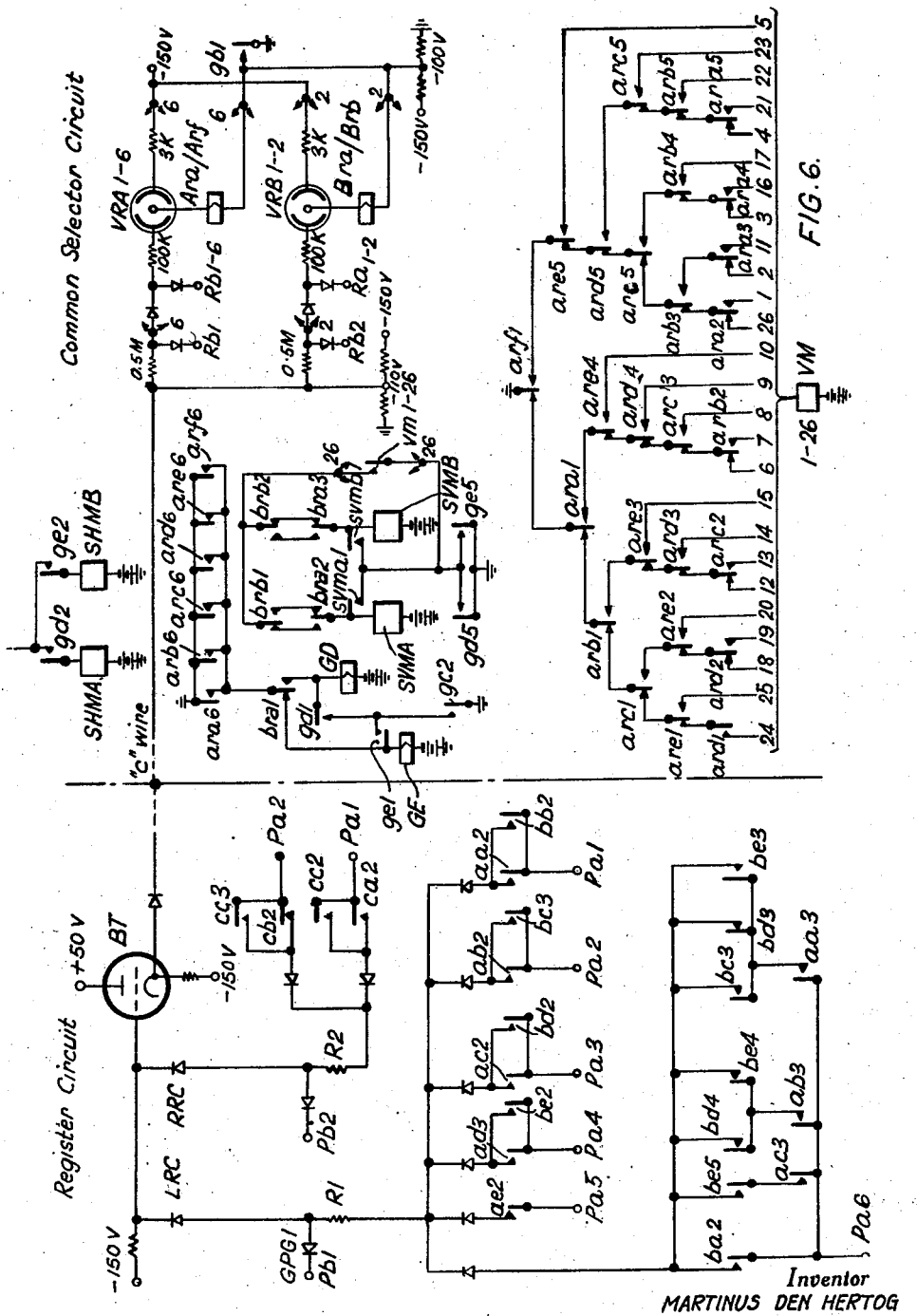

FIG. 7.

TABLE-1-

| OUTLET NUMBERS | | | | RELAYS OPERATED AT REGISTER | | SIGNALS SENT PERIOD $Pb_1$ | RELAYS OPERATED AT SELECTOR PART. | | | | | | VERT MAGN. V OPERATED |
|---|---|---|---|---|---|---|---|---|---|---|---|---|---|
| | | | | | | | Sar | Sbr | Scr | Sdr | Ser | Sfr | |
| 00 | 25 | 50 | 75 | Rb | Sa | $Ra_1 + Ra_6$ | + | | | | | + | 1 |
| 01 | 26 | 51 | 76 | Rc | Sa | $Ra_2 + Ra_6$ | | + | | | | + | 2 |
| 02 | 27 | 52 | 77 | Rd | Sa | $Ra_3 + Ra_6$ | | | + | | | + | 3 |
| 03 | 28 | 53 | 78 | Re | Sa | $Ra_4 + Ra_6$ | | | | + | | + | 4 |
| 04 | 29 | 54 | 79 | Rf | Sa | $Ra_5 + Ra_6$ | | | | | + | + | 5 |
| 05 | 30 | 55 | 80 | Rb | Sb | $Ra_1$ | + | | | | | | 6 |
| 06 | 31 | 56 | 81 | Rc | Sb | $Ra_2 + Ra_1$ | + | + | | | | | 7 |
| 07 | 32 | 57 | 82 | Rd | Sb | $Ra_3 + Ra_1$ | + | | + | | | | 8 |
| 08 | 33 | 58 | 83 | Re | Sb | $Ra_4 + Ra_1$ | + | | | + | | | 9 |
| 09 | 34 | 59 | 84 | Rf | Sb | $Ra_5 + Ra_1$ | + | | | | + | | 10 |
| 10 | 35 | 60 | 85 | Rb | Sc | $Ra_1 + Ra_2 + Ra_6$ | + | + | | | | + | 11 |
| 11 | 36 | 61 | 86 | Rc | Sc | $Ra_2$ | | + | | | | | 12 |
| 12 | 37 | 62 | 87 | Rd | Sc | $Ra_3 + Ra_2$ | | + | + | | | | 13 |
| 13 | 38 | 63 | 88 | Re | Sc | $Ra_4 + Ra_2$ | | + | | + | | | 14 |
| 14 | 39 | 64 | 89 | Rf | Sc | $Ra_5 + Ra_2$ | | + | | | + | | 15 |
| 15 | 40 | 65 | 90 | Rb | Sd | $Ra_1 + Ra_3 + Ra_6$ | + | | + | | | + | 16 |
| 16 | 41 | 66 | 91 | Rc | Sd | $Ra_2 + Ra_3 + Ra_6$ | | + | + | | | + | 17 |
| 17 | 42 | 67 | 92 | Rd | Sd | $Ra_3$ | | | + | | | | 18 |
| 18 | 43 | 68 | 93 | Re | Sd | $Ra_4 + Ra_3$ | | | + | + | | | 19 |
| 19 | 44 | 69 | 94 | Rf | Sd | $Ra_5 + Ra_3$ | | | + | | + | | 20 |
| 20 | 45 | 70 | 95 | Rb | Se | $Ra_1 + Ra_4 + Ra_6$ | + | | | + | | + | 21 |
| 21 | 46 | 71 | 96 | Rc | Se | $Ra_2 + Ra_4 + Ra_6$ | | + | | + | | + | 22 |
| 22 | 47 | 72 | 97 | Rd | Se | $Ra_3 + Ra_4 + Ra_6$ | | | + | + | | + | 23 |
| 23 | 48 | 73 | 98 | Re | Se | $Ra_4$ | | | | + | | | 24 |
| 24 | 49 | 74 | 99 | Rf | Se | $Ra_5 + Ra_4$ | | | | + | + | | 25 |
| ROUTINE TEST | | | | — | — | $Ra_6$ | | | | | | + | 26 |

TABLE-2-

| OUTLET NUMBERS | RELAYS OPERATED AT REGISTER | SIGNALS SENT IN PERIOD $Pb_2$ | RELAYS OPERATED AT SELECTOR PART. | | | | SERVO MAGN. OPERATED | | | |
|---|---|---|---|---|---|---|---|---|---|---|
| | | | | | | | VERTICAL | | HORIZONTAL | |
| | | | Tar | Tbr | Dr | Er | SVa | SVb | SHa | SHb |
| 00-24 | Ta | $Ra_1$ | + | | + | | + | | + | |
| 25-49 | Tb | $Ra_2$ | | + | | + | + | | | + |
| 50-74 | Tc | $Ra_1 + Ra_2$ | + | + | + | | | + | + | |
| 75-99 | Td | — | — | — | | + | | + | | + |

May 11, 1954 M. DEN HERTOG 2,678,354
AUTOMATIC TELECOMMUNICATION EXCHANGE SYSTEM
Filed Jan. 13, 1951 9 Sheets-Sheet 9

FIG. 9.

| COMB | Pa | Pb | Pc | POS<sup>n</sup> IN TIME | COMB | Pa | Pb | Pc | POS<sup>n</sup> IN TIME | COMB | Pa | Pb | Pc | POS<sup>n</sup> IN TIME | COMB | Pa | Pb | Pc | POS<sup>n</sup> IN TIME | COMB | Pa | Pb | Pc | POS<sup>n</sup> IN TIME |
|---|---|---|---|---|---|---|---|---|---|---|---|---|---|---|---|---|---|---|---|---|---|---|---|---|
| 00 | 1 | 1 | 1 | 1 | 25 | 1 | 1 | 2 | 31 | 50 | 1 | 1 | 3 | 61 | 75 | 1 | 1 | 4 | 91 |
| 01 | 2 | 1 | 1 | 2 | 26 | 2 | 1 | 2 | 32 | 51 | 2 | 1 | 3 | 62 | 76 | 2 | 1 | 4 | 92 |
| 02 | 3 | 1 | 1 | 3 | 27 | 3 | 1 | 2 | 33 | 52 | 3 | 1 | 3 | 63 | 77 | 3 | 1 | 4 | 93 |
| 03 | 4 | 1 | 1 | 4 | 28 | 4 | 1 | 2 | 34 | 53 | 4 | 1 | 3 | 64 | 78 | 4 | 1 | 4 | 94 |
| 04 | 5 | 1 | 1 | 5 | 29 | 5 | 1 | 2 | 35 | 54 | 5 | 1 | 3 | 65 | 79 | 5 | 1 | 4 | 95 |
| 05 | 1 | 2 | 1 | 7 | 30 | 1 | 2 | 2 | 37 | 55 | 1 | 2 | 3 | 67 | 80 | 1 | 2 | 4 | 97 |
| 06 | 2 | 2 | 1 | 8 | 31 | 2 | 2 | 2 | 38 | 56 | 2 | 2 | 3 | 68 | 81 | 2 | 2 | 4 | 98 |
| 07 | 3 | 2 | 1 | 9 | 32 | 3 | 2 | 2 | 39 | 57 | 3 | 2 | 3 | 69 | 82 | 3 | 2 | 4 | 99 |
| 08 | 4 | 2 | 1 | 10 | 33 | 4 | 2 | 2 | 40 | 58 | 4 | 2 | 3 | 70 | 83 | 4 | 2 | 4 | 100 |
| 09 | 5 | 2 | 1 | 11 | 34 | 5 | 2 | 2 | 41 | 59 | 5 | 2 | 3 | 71 | 84 | 5 | 2 | 4 | 101 |
| 10 | 1 | 3 | 1 | 13 | 35 | 1 | 3 | 2 | 43 | 60 | 1 | 3 | 3 | 73 | 85 | 1 | 3 | 4 | 103 |
| 11 | 2 | 3 | 1 | 14 | 36 | 2 | 3 | 2 | 44 | 61 | 2 | 3 | 3 | 74 | 86 | 2 | 3 | 4 | 104 |
| 12 | 3 | 3 | 1 | 15 | 37 | 3 | 3 | 2 | 45 | 62 | 3 | 3 | 3 | 75 | 87 | 3 | 3 | 4 | 105 |
| 13 | 4 | 3 | 1 | 16 | 38 | 4 | 3 | 2 | 46 | 63 | 4 | 3 | 3 | 76 | 88 | 4 | 3 | 4 | 106 |
| 14 | 5 | 3 | 1 | 17 | 39 | 5 | 3 | 2 | 47 | 64 | 5 | 3 | 3 | 77 | 89 | 5 | 3 | 4 | 107 |
| 15 | 1 | 4 | 1 | 19 | 40 | 1 | 4 | 2 | 49 | 65 | 1 | 4 | 3 | 79 | 90 | 1 | 4 | 4 | 109 |
| 16 | 2 | 4 | 1 | 20 | 41 | 2 | 4 | 2 | 50 | 66 | 2 | 4 | 3 | 80 | 91 | 2 | 4 | 4 | 110 |
| 17 | 3 | 4 | 1 | 22 | 42 | 3 | 4 | 2 | 51 | 67 | 3 | 4 | 3 | 81 | 92 | 3 | 4 | 4 | 111 |
| 18 | 4 | 4 | 1 | 23 | 43 | 4 | 4 | 2 | 52 | 68 | 4 | 4 | 3 | 82 | 93 | 4 | 4 | 4 | 112 |
| 19 | 5 | 4 | 1 | 23 | 44 | 5 | 4 | 2 | 53 | 69 | 5 | 4 | 3 | 83 | 94 | 5 | 4 | 4 | 113 |
| 20 | 1 | 5 | 1 | 25 | 45 | 1 | 5 | 2 | 55 | 70 | 1 | 5 | 3 | 85 | 95 | 1 | 5 | 4 | 115 |
| 21 | 2 | 5 | 1 | 26 | 46 | 2 | 5 | 2 | 56 | 71 | 2 | 5 | 3 | 86 | 96 | 2 | 5 | 4 | 116 |
| 22 | 3 | 5 | 1 | 27 | 47 | 3 | 5 | 2 | 57 | 72 | 3 | 5 | 3 | 87 | 97 | 3 | 5 | 4 | 117 |
| 23 | 4 | 5 | 1 | 28 | 48 | 4 | 5 | 2 | 58 | 73 | 4 | 5 | 3 | 88 | 98 | 4 | 5 | 4 | 118 |
| 24 | 5 | 5 | 1 | 29 | 49 | 5 | 5 | 2 | 59 | 74 | 5 | 5 | 3 | 89 | 99 | 5 | 5 | 4 | 119 |

Inventor
MARTINUS DEN HERTOG

By Robert Harding Jr.
Attorney

Patented May 11, 1954

2,678,354

UNITED STATES PATENT OFFICE 2,678,354

AUTOMATIC TELECOMMUNICATION EXCHANGE SYSTEM

Martinus den Hertog, Antwerp, Belgium, assignor to International Standard Electric Corporation, New York, N. Y., a corporation of Delaware Application January 13, 1951, Serial No. 205,915

Claims priority, application Great Britain January 16, 1950

12 Claims. (Cl. 179—18)

This invention relates to automatic telecommunication exchange systems.

One feature of the invention resides in arrangements whereby selective operations for several calls can proceed in a common control circuit for a number of selector switches, simultaneously with one another and with the actual setting of the associated selector switches.

Another feature of the invention resides in arrangements whereby register controllers themselves both control selection of an outlet from a selector stage and record the identity of the selected outlet for subsequent use in controlling switching through at the selector stage to the selected outlet.

A further feature relates to double test arrangements to prevent selection of the same outlet by selectors under control of different registers, whether the selectors are part of the same or of different multi-switches.

The scope of the invention is not limited to the above features and includes any other novel feature disclosed or foreshadowed in the following description of certain embodiments of the invention shown in the accompanying drawings in which:

Fig. 5 shows the circuit of the common control circuit for the multi-switch of which the individual switch of Fig. 4 forms part.

Figure 8:
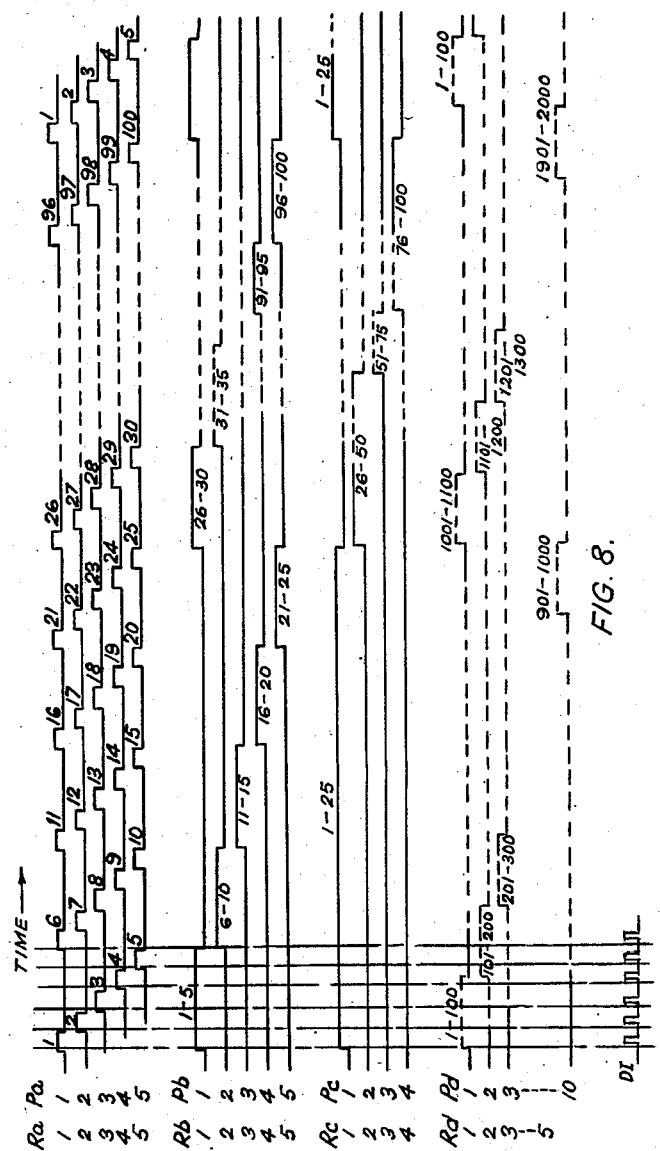

Fig. 6 shows inter-working circuits between the register controller and the common control circuit for setting selected outlet identity recording equipment in the common control circuit from the similar equipment in the register, while Fig. 7 shows tables detailing the permutation code employed for transmitting the outlet identity from register to common control circuit in Fig. 6, while Fig. 8 shows a diagram of the time-cycles employed to control selection.

Fig. 9 shows a table indicating the method of employing the impulses of Fig. 8 to control selection.

Figure 1:
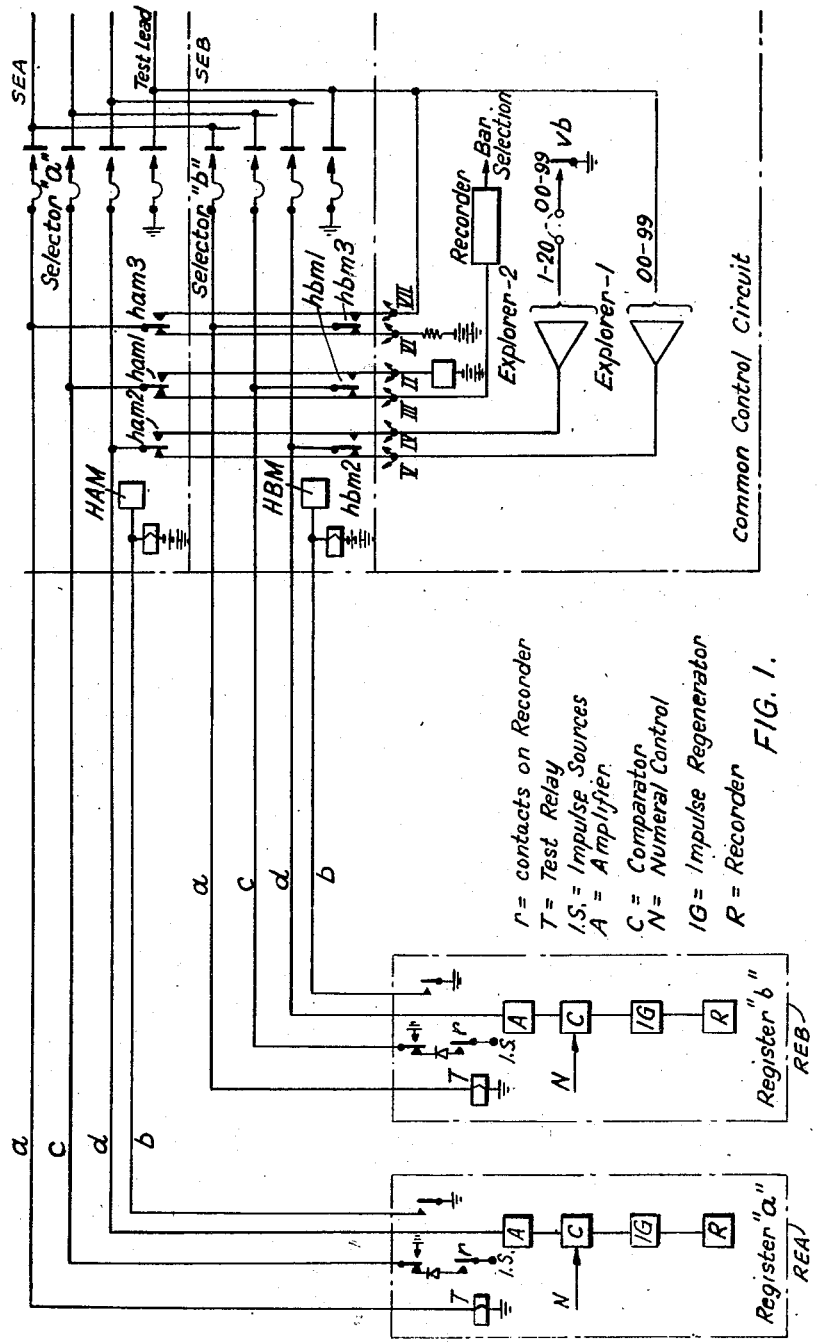
Fig. 1 shows schematically the way in which two registers control two individual selectors of the same cross-bar multi-switch in co-operation with the common control circuit of said multi-switch.

Fig. 1 illustrates the principle whereby each of a plurality of registers may simultaneously control a selection via different individual selectors forming part of the same multi-switch. A static outlet explorer in the common control circuit of the multi-switch is permanently available for signalling the availability of all outlets from the multi-switch to all registers connected to like multi-switches for selection purposes, regardless of whether the common control circuit is also in use for causing the through connection of one of its individual switches in accordance with a selection made by an associated register controller.

Assuming, for example, that two registers REA and REB represented in Fig. 1, each control a connection, register REA via selector SEA and register REB via selector SEB, forming part of the same multi-switch as selector SEA, the exploring circuit at the electronic selection and bar operating circuit, (referred to hereinafter as the "ESBO" circuit), of this multi-switch will transmit for each free outlet an impulse in the corresponding time position from explorer No. 1 via break contacts $ham2$, $hbm2$ and the $d$ wires of both selectors to the corresponding register. Assuming now that one of the two registers receives an impulse corresponding to a free outlet of the wanted group, this impulse will coincide with the impulse supplied locally at the register to the comparator to indicate this wanted group, and this comparator will function and by means of the impulse regenerator pass on this impulse to record the number of the outlet at the register. The register now closes the test circuit for testing on the ESBO circuit and renders this busy for switch operating purposes. The register is now able to proceed with the transfer of the outlet identity to the ESBO via the $c$ wire and break contact $ham1$ or $hbm1$ at the selector concerned, after which it causes the operation of the horizontal magnet HAM or HBM at the selector owing to which contacts $ham1 \ldots 5$ or $hbm \ldots 5$ change over.

In this connection it will be seen that the $a$, $c$ and $d$ wires for this register are changed over to other circuits at the ESBO circuit, but the other register(s), which did not yet succeed in finding a free outlet in the wanted group, remains connected via the break contacts of magnet H at the respective selector(s) to wires V, III and VI at the ESBO. Since at the moment the first register succeeds in finding a free outlet of the wanted group, the explorer No. 1 at the register is not prevented from transmitting further impulses, this explorer is able to continue to transmit its impulses to the second register and all further registers that may become engaged in conjunction with the same multi-selector, also during the time that the first register referred to has busied the ESBO circuit for switch operating purposes only and is in the act of completing the connection by means of the ESBO circuit through the selector it is connected to.

During the time one selector is being switched through, all other calls using the same multi-switch are allowed to explore for free outlets and any register which during this interval finds a free outlet will record this on its own recording equipment and try to engage the ESBO circuit.

In the circuits to be described, the time during which a register may hold a record of a free outlet before it finds the ESBO circuit free is determined by the releasing time of a relay, approximately 300 m. s. If after this interval the ESBO is not found free, the register cancels the records of the outlet found and starts to explore afresh. It is evident that the time during which a register may be caused to wait may be varied by suitable means, so that even if two or three registers operating in conjunction with the same ESBO circuit would hold a record of a free outlet simultaneously, they would not cancel this outlet until they had the time to complete their connection successively.

Figs. 2–5 will now be described. The object of a group selector circuit is to effect the selection of a free outlet in a group chosen from a plurality of groups under the control of a register in accordance with the corresponding digit of the desired subscriber's number.

Figure 4:
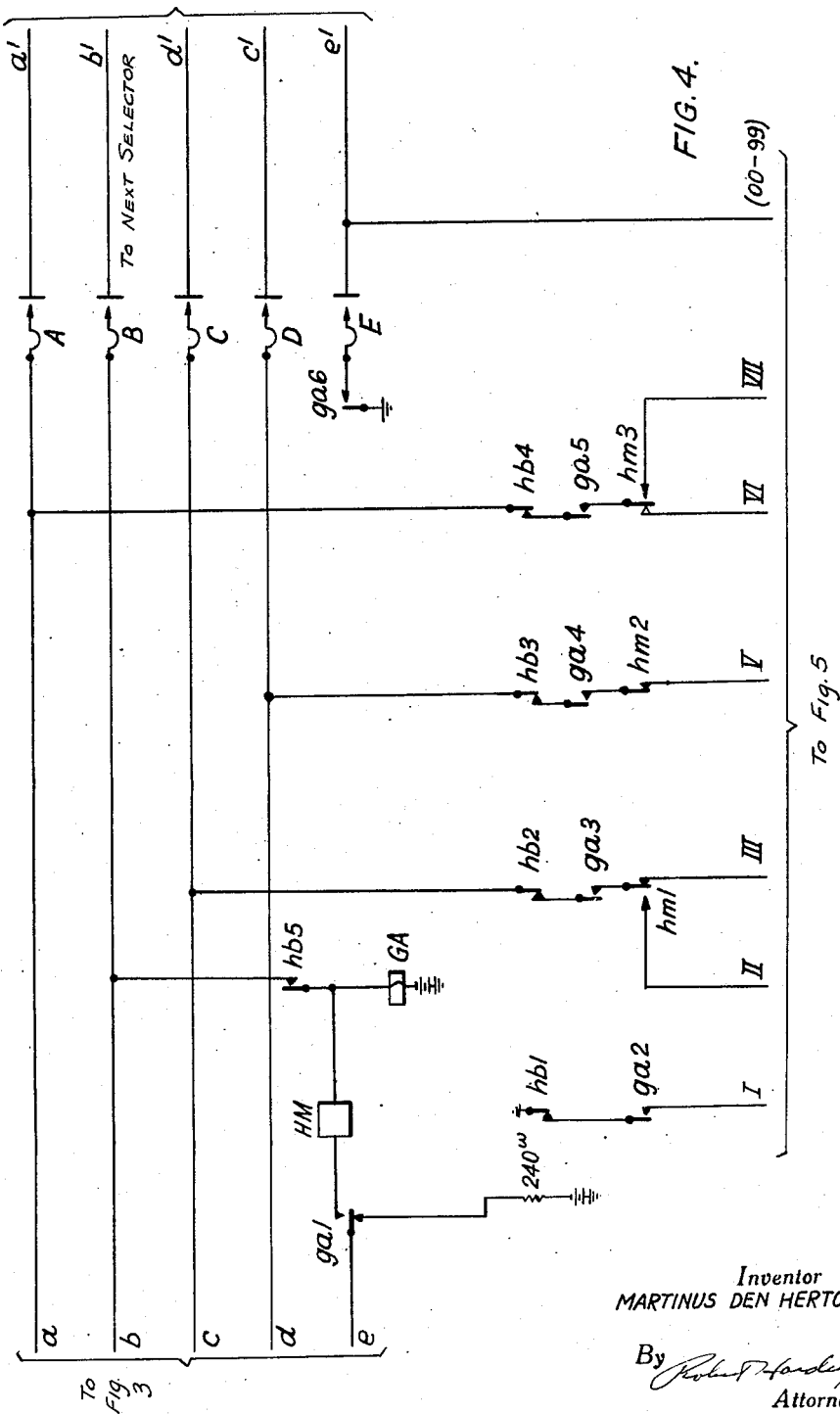
Fig. 4 shows the individual circuits of an individual group selector forming part of a cross-bar multi-switch to illustrate the invention.

Figs. 4 and 5 are based on the use of a multi-switch which comprises a certain number of horizontal bars each of which may be considered as representing an individual switch capable of handling a call in a similar manner to that of a switch of a well-known single-motion type. By way of example, 100 outlets have been provided common to all individual switches and accessible to said switches. Vertical bars are also provided which cross all the horizontal bars and control the selection of a particular outlet, which has to be connected to an individual switch, by the action of the horizontal bar associated therewith. The operation of the multi-switch will be described later in a more detailed manner.

A multi-selector comprises a number of individual selectors which share a common bare wire multiple and a common selecting mechanism. The bare wire multiple is arranged in a vertical manner and the individual selectors are arranged in a horizontal manner in the multi-selector. Each individual selector is provided with a set of inlet wires. If a multi-selector gives access to 100 outlets, for example, there will be 100 sets of vertical multiple wires, with any one of which sets any of the sets of inlet wires may be brought into contact. This contact is effected by means of flexible contact springs under the combined action of vertical and horizontal bars, each horizontal bar corresponding to one of the individual selectors, or inlets, and each vertical bar corresponding to two of the outlets, or sets of vertical wires. At each intersecting point of a horizontal inlet and two sets of vertical outlets the contacts may be established by the combined action of the corresponding horizontal and vertical bars. The actual contact is established by means of a contact pusher which moves all individual contacts of the set of contacts concerned and of which contact pushers one is provided for each of the intersecting points between horizontal and vertical bars. As at each intersecting point contact may be established between one inlet and either of two outlets, one of these two outlets is selected by moving the contact pusher either in a forward or in a backward direction.

Summarising the above, there will be as many horizontal bars as there are individual selectors in a multi-switch. The number of vertical bars is equal to half the number of outlets constituting the multiple of the multi-switch. At each intersecting point of horizontal and vertical bars a contact pusher is provided which, by forward or backward movement, may bring the inlet corresponding to the horizontal bar into contact with one of the two outlets corresponding to the vertical bar.

The vertical bars are arranged in pairs, so that for a multi-switch with 100 outlets, the 50 vertical bars will be arranged in 25 pairs. In addition to these, a 26th pair is usually provided for routine test purposes, but may be left out of consideration for the moment. For the control of each pair of vertical bars one common vertical magnet VM, Fig. 5, is provided, so that the multi-switch comprises 25 of these vertical magnets. Only one of the two vertical bars indicated by an operated vertical magnet may be caused to move by the operation of one of two common so-called "vertical servo" magnets SVMA, SVMB, Fig. 5, which are provided in common for all 25 vertical magnets and which, in association with one of the vertical magnets which indicates the pair, causes one of the vertical bars of the pair to be moved upwards.

The selection of one of the 50 vertical bars therefore happens in two steps, first by the operation of one out of 25 vertical magnets indicating the pair, and next by the operation of one out of two servo magnets which operates one of the bars of the indicated pair.

The horizontal bar associated with each individual selector is associated with an individual control magnet HM, Fig. 4, which, when operated, indicates that the associated horizontal bar has to be moved. The actual movement takes place by means of one out of two common so-called "horizontal" servo magnets SHMA, SHMB, Fig. 5, which causes the horizontal bar indicated by the operated horizontal magnet to be moved either in a left-hand or in a right-hand direction. The movement of the horizontal bar therefore happens also in two steps, first by the operation of the individual horizontal magnet which indicates the horizontal bar to be moved, and next by the operation of one of the two horizontal servo magnets, which causes the horizontal bar indicated to be moved either to the right or to the left and which thereby causes the contact pusher located at the intersection of the operated horizontal and vertical bars to be moved either in a forward or a backward direction, thereby closing one set of contacts.

After these operations have happened, both the individual vertical magnet and the vertical servomagnet releases, so that the vertical bar again drops in its original posiiton. The common horizontal servomagnet operated also releases, but the individual horizontal magnet is held energised and thereby holds the horizontal bar mechanically locked in its operated position and thereby keeps a contact pusher moved out and the contacts closed. When this horizontal magnet releases, the horizontal bar and the contact pusher are restored to their normal position and the contacts are opened.

As regards the numbering of the outlets in relation to the operation of the different selector magnets the following may be observed:

The 100 outlets are arranged in four rows of 25 each, which are numbered 00-24, 25-49, 50-74 and 75-99 respectively.

Each pair of vertical bars, and therefore each of the vertical magnets VM, Fig. 5, corresponds to one outlet in each of these four rows. Thus vertical magnet No. 1 corresponds to the first outlet of each row (00, 25, 50 and 75), vertical magnet No. 2 to the second of each row (01, 26, 51 and 76) etc. All of those vertical bars which are lifted by the first vertical servomagnet SVMA, Fig. 5, correspond to the first two rows of 25 outlets (00-49), those lifted by the second vertical servomagnet SVMB, Fig. 5, correspond to the last two rows of 25 outlets (50-99). It will be clear from this that by the successive operation of one vertical magnet VM and one vertical servo magnet SVMA or SVMB, two outlets will be indicated by the operation of one vertical bar, viz. either one outlet each in rows 1 and 2 or one each in rows 3 and 4.

After an individual horizontal magnet HM, Fig. 4, by its operation, has indicated the individual selector for which contact has to be established, the corresponding horizontal bar will be moved in one of two directions, depending on whether the horizontal servomagnet SHMA or SHMB, Fig. 5, operates. The contact pusher located at the inter-section of the operated vertical and horizontal bars will accordingly be moved in one of two directions and thereby establish contact with one of the two outlets indicated by the operated vertical bar. The arrangement of the horizontal servomagnets is such that SHMA causes a contact to be closed either in rows 1 or 3, and SHMB either in rows 2 or 4. Therefore SHMA controls outlets 00-24 and 50-74 and SHMB outlets 25-49 and 75-99.

A multi-switch of this type is employed in the case of one hundred outlets: a certain number of individual switches are provided, said number varying with the traffic requirements, each of them being adapted to be used independently to establish a connection to a free outlet.

Each of the switches has an individual selector circuit, Fig. 4, comprising a "horizontal electro-magnet" HM, forming part of the multi-switch, and a relay GA.

A common control circuit (Fig. 5) has been provided for all the individual group selectors of a multi-switch. This circuit, by employing electronic means, as also a certain number of periodic cycles of electrical impulses, and under the control of a register, Fig. 2, can carry out hunting and/or selecting operations for one of the individual selectors, and control the operation of a vertical bar and a horizontal bar of the multi-switch in order to complete the connection employed by the call, when the outlet has been seized. The selection of a free outlet in a particular group is made under the control of the first digit of the desired subscriber's number. An available final selector, for instance, is chosen from ten different groups of selectors, e. g. each of said selectors serving 100 lines. This selection is made under the control of the hundreds digit of the desired subscriber's number, as it has been stored in the register which controls the selection.

In accordance with another method the selection may be made under the control of the register without direction relation to a particular digit, but as one of a variable number of selections determined by a combination of digits in accordance with a well-known method.

The hundred outlets may be distributed in all conceivable ways, in any number of groups, usually ten. This number is in no way limited.

The number of groups of outlets may be modified as desired; the number of outlets assigned to each group may be modified as desired, according to the traffic requirements, and the outlets of each of the groups may be taken haphazard from one of the hundred outlets available.

The equipment and the circuit of the common control switch are always the same and are not dependent on the way in which the outlets are distributed in the various groups.

The register controlled comprises a device of any known type for registering digits; the circuits employed for connecting the register controller to the selector may also be carried out in accordance with well-known principles.

Figure 2:
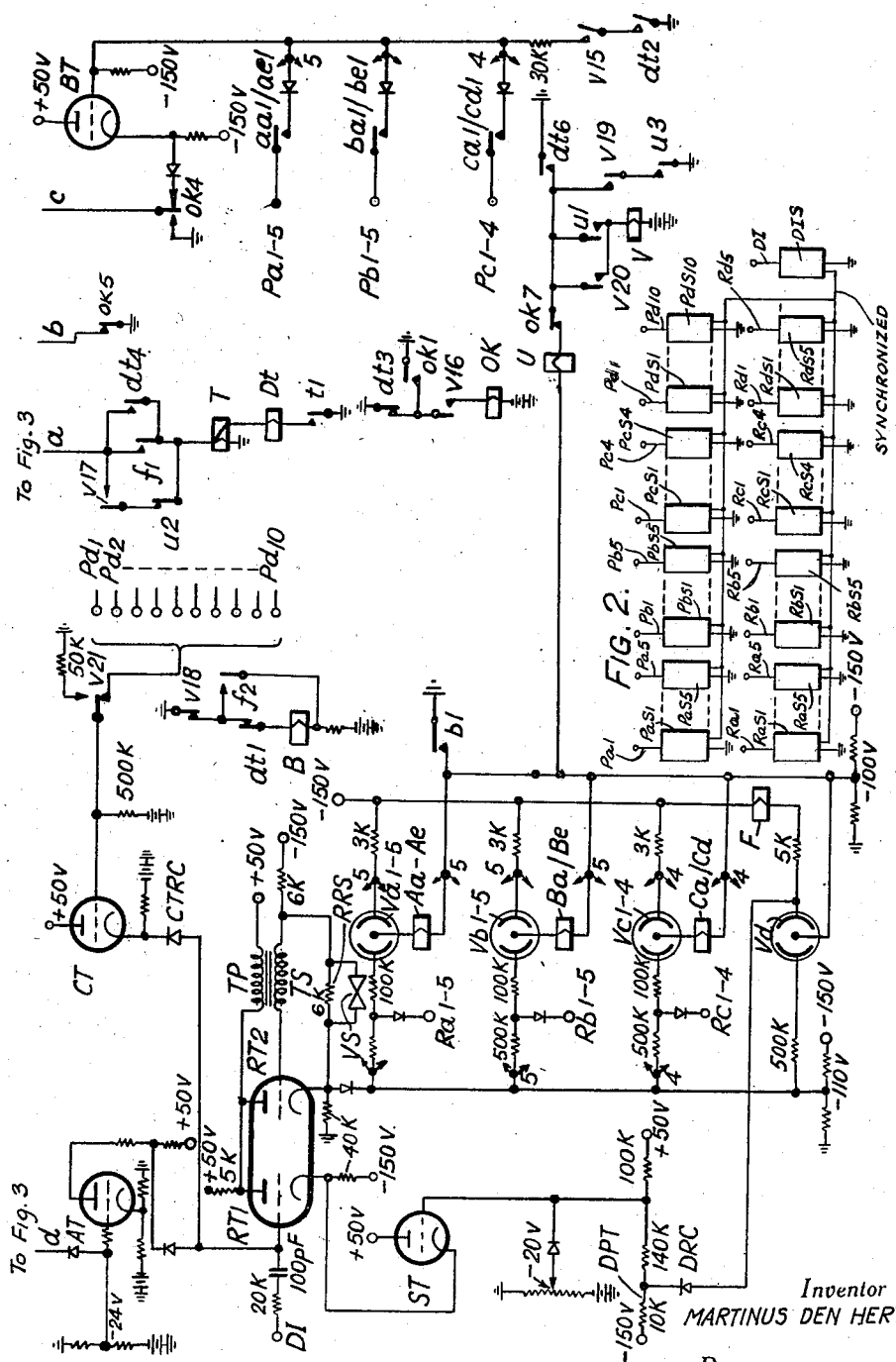
Fig. 2 shows sufficient of the circuit of a register controller to illustrate the invention.

Consequently, it will be assumed that the digits making up the number of the desired line have been received anad registered, and that the register controller, shown in Fig. 2, has been connected to the first selection stage through the wires $a, b, c, d$. The earth applied through $ok5$ (Fig. 2) and the wire $b$ cause the actuation of the relay GA, Fig. 4 in the first group selector through a back contact $hb5$ associated with the horizontal bar of the individual switch.

The relay GA, in operating, immediately causes the connection of the group selector circuit to the corresponding common control circuit, by respectively connecting the wires $a, c$ and $d$ to said common control circuit through the front contacts $ga5$, $ga3$ and $ga4$.

Figure 3:
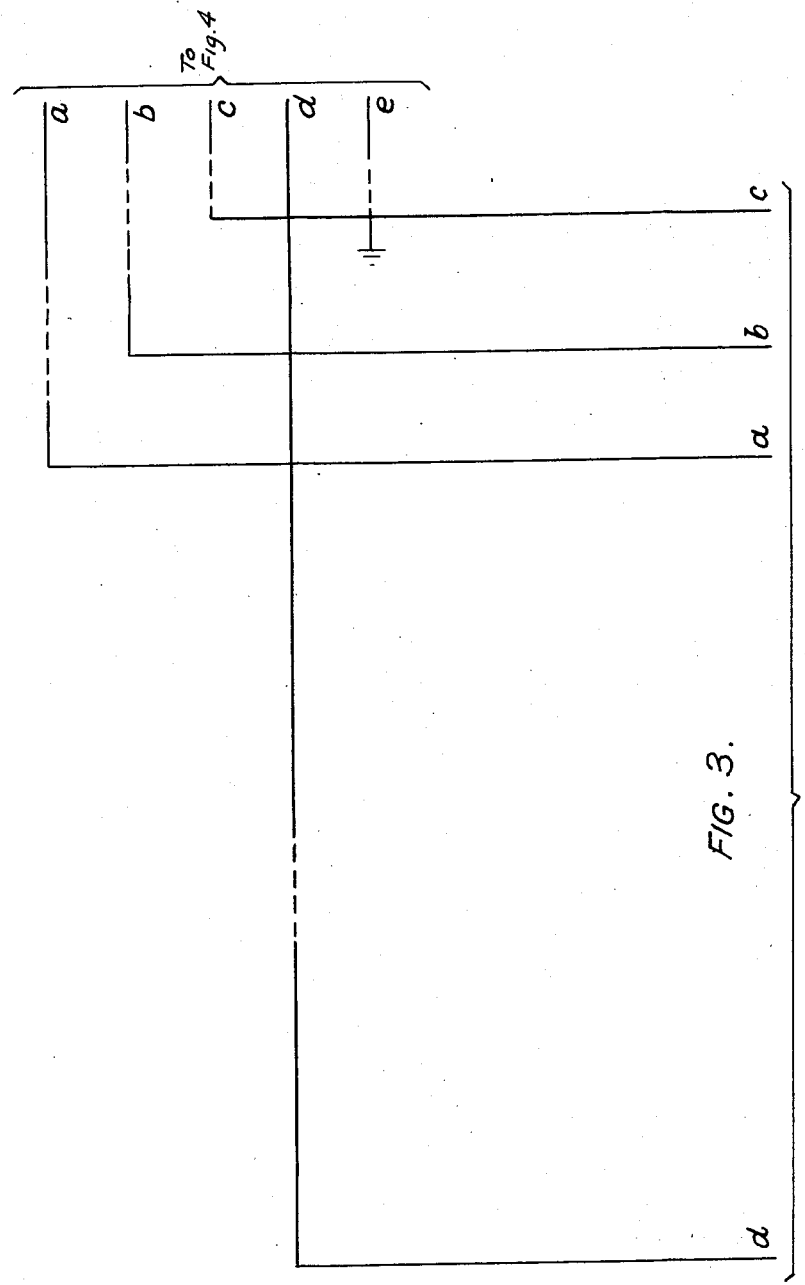
Fig. 3 shows the circuits from a register controller through a link circuit to a first group selector.

Moreover, the relay GA prepares for itself a holding circuit through the wire $e$, in series with the winding of the horizontal electromagnet HM and the front contact $ga1$; the said electromagnet cannot operate at the moment under consideration owing to the fact that earth is directly connected to two ends of its winding, the wire $e$ being in fact directly earthed as shown in Fig. 3.

The common control circuit is set in the operative position, earth being connected to said common control circuit through the following circuit: back contact $hb1$, associated with the horizontal bar, front contact $ga2$, lead I, back contacts $svma2$, $svmb2$ of the vertical servo magnets described below, back contact $gc3$, relay GB, resistance and battery. The relay GB of the common control circuit operates, and through its front contact $gb1$ applies earth to the anodes of the cold cathode tubes VRA, VRB, VRC.

A resistance $Rg$ of 100,000 ohms has been provided in the common control circuit for each of the 100 outlets which can be reached through a group of selectors, this resistance being connected at one of its ends to the next selection stage through the wire $e'$, Fig. 4. If the outlet is free, the wire $e'$ is connected to negative battery potential, through a back contact $ga1$ of the relay GA of the next selector, as is shown in the left of the circuit of the first selector, Fig. 4. When an outlet is busy, the potential on this lead will be ground via front contacts $ga6$ of the preceding selector.

When the resistance $Rg$ associated with an outlet is connected to negative potential, a current flow tends to be established from this potential towards a point of earth potential, associated with the grid of an amplifier tube ET1 which forms one of the elements of a double triode ET1, ET2, through three successive rectifier stages, placed in series ARCS, BRCS, CRCS, and rectifiers placed in shunt ARCP ... DRCP. The rectifiers placed in shunt, ARCP ... DRCP are connected to sources of current which will be described in the following paragraphs.

Fig. 8 shows the cycles of impulses produced by the different sources, said impulses being employed as time bases in order to obtain a 1000-element code.

Two principal groups of impulses have been provided; the first are designated by the references Pa, Pb ... and are produced by the sources PaS, PbS ..., shown in Fig. 2, and the others by Ra, Rb ... and are produced by the sources RaS, RbS .... The principal difference between these two groups of impulses consists in their difference of potential. There are both positive-going and negative-going P pulses used, although Fig. 8 only shows the positive-going pulses. The impulses P are always provided for insertion in the grid circuit of an amplifier tube, and their potentials have been determined accordingly. The impulses R are always provided for application to the control electrodes of cold cathode tubes and their potentials have been adapted to the operative conditions of said tubes.

Each of the groups Pa and Ra are produced by five sources, PaS1-5, RaS1-5, supplying an impulse for five time units which succeed each other in accordance with a periodic cycle, the length of each of these impulses corresponds to the duration of the time unit on which the whole system is based and will be referred to in the following description as a "unit" of time.

Each of the two groups Pb, Rb are produced by five sources, PbS1-5, RbS1-5, supplying an impulse for five time units which succeed each other in accordance with a periodic cycle. The length of each of the impulses corresponds to six time units and their period to thirty time units.

Each of the two groups Pc and Rc are produced by four sources, PcS1-4, RcS1-4, of time impulses, the length and period of which respectively correspond to 30 and 120 time units.

The group Pd is produced by ten sources Pd1-10, of which the impulses correspond to 100 time units and the period to 1000 time units. These ten sources, like those of the other groups, produce time impulses displaced with respect to each other in such a way that the impulse produced by each of the sources comes after that of the preceding source.

The sources of the three first types of impulses, that is, Pa, Pb and Pc are employed to control the transmission of a signal constituted by a time impulse, as also the detection of a signal constituted in the same manner. The simultaneous use of any three sources of different types makes it possible to obtain $5 \times 5 \times 4 = 100$ time units. At the transmitting end these 100 time units are employed for scanning 100 outlets.

The sources for producing impulses Pd1 ... 10 are employed for associating a special group indication to each of the outlets; thus in the case of outlets of a group selector, these sources are employed to characterise the group of said outlets.

Fig. 9 is a table showing combinations of sending impulses Pa ... Pc which may be applied to three gates supplying impulses to the register controllers; Fig. 5 shows a gate composed of rectifiers which make it possible for 100 outlets to send an impulse to the grid circuit of the amplifier tube ET1 in 100 different time units, the said tube retransmitting these impulses to the register. Fig. 9 shows combinations of impulses Pa ... Pc which may be applied to three successive stages of gates, such as ARCP, BRCP, CRCP, shown on the common control circuit of the selector (Fig. 5). The table shows the impulses which must be used for the gates associated with each outlet. This table also shows in which time unit an impulse must be sent for each of the outlets.

The impulses applied to the gates ARCP, BRCP, and CRCP are in the negative direction. This means that the potential of the source is normally at earth potential and becomes more negative at the time of the impulse. When any one of the sources is at earth potential, current flows through the associated rectifier and through resistor Rg to the source of negative potential on the wire $e'$, and earth potential continues to appear on the grid of tube ET1 because of the potential drop across resistor Rg. It is only when all three of the impulses Pa, Pb, and Pc are negative, that the associated rectifiers are blocked and current then flows from earth, through the resistor connected to the grid of tube ET1, through the rectifiers CRCS, BRCS, and ARCS, and through the resistor Rg to the $e'$ wire. This lowers the potential on the grid of tube ET1 because of the potential drop in the resistor connected thereto.

The branch rectifiers thus act as gates which can open or close the circuit to ET1: only when the gates are closed by the application of a relatively-negative potential by the associated sources can negative test potential be applied to ET1. It is thus only at this moment that the potential of the grid of tube ET1 will be negative, provided that the outlet is free, that is to say, provides a negative potential.

It will now be seen that the three sets of impulses Pa, Pb and Pc are applied to the gates in such a way that said gates pass the current at different time units for each of the 100 outlets; when a circuit is free it sends negative impulses to the grid circuit of the tube ET1 for a time unit which characterises this outlet. The manner of connecting the various gates, which makes it possible to obtain this result for the various outlets, numbers 00 to 99, is shown on the table in Fig. 9, which also shows the time units corresponding to the impulses transmitted by each of the outlets. Each outlet of a group selector is connected in the common control circuit (Fig. 5) with an individual gate which itself is connected to one of the sources of impulses Pa1 ... 5. Each of the twenty successive groups of five outlets, corresponding to the time units 1 ... 5, 6 ... 10, and connected to the various sources PaS, is associated with a second stage of gates constituted by the rectifiers BRCS, BRCP. Four successive super-groups of five groups each are associated with a third stage of gates constituted by the rectifiers CRCS, CRCP. Thus in all, there are $$\frac{100}{5} = 20 \text{ gates}$$

in the second stage which are divided in turn into four groups of five. The gates of each of these groups are respectively connected to the five sources of impulses Pb1 ... 5. The third stage of gates CRCS and CRCP common to said groups are each connected to one of the sources of impulses Pc1 ... 4.

Each of the outlets connected to a gate associated with one of the sources of impulses Pa1 ... 5 is also connected to a second gate DRCP, which may be connected to one of the ten sources PdS1-10 supplying impulses Pd1 to Pd10 by connections which can be displaced as desired.

This connection characterises the group to which the outlet belongs, a connection terminating in a source PdS1 or PdS2 indicating that the outlet belongs to group No. 1 or to group No. 2.

It is obvious that the potential supplied by wire e' will be absorbed in the resistance Rg at any moment, except when the source PdS connected to the particular gate supplies a relatively negative potential. In other words, for the outlets of group No. 1, the grid of the amplifier tube is only influenced during the time unit when the source PdS1 is sending out an impulse Pd1, that is to say, during the time units 1-100. Similarly the outlets forming part of the second group can only influence the grid potential in the time units 101 ... 200, and so on.

The result of this is that for each outlet an impulse from the wire e' can only be sent to the grid circuit in one of the 1000 time units, which characterises both the number of the outlet and the group to which said circuit belongs.

For example, the outlet No. 25, according to the table in Fig. 9, would send an impulse in time unit No. 25 under the control of sources Pa, Pb and Pc. When this outlet is connected for example, to group No. 5, source Pd5 at any moment will absorb the impulses transmitted by said circuit, except in the period corresponding to the fifth group of 100 time units, so that in these conditions an impulse is only sent in the 25th time unit of the fifth period, that is to say, in time unit No. 425.

Recapitulating, when an outlet is free, negative battery potential will be present on its test lead e', and when the outlet is occupied, the potential on this lead will be a ground potential. The sources connected to the explorer constituted by the rectifier gate network are such that in the normal condition they provide a relatively positive potential and in the peak condition, they provide a relatively negative potential. The result of this is that when an outlet is free, a negative impulse will be supplied in the corresponding time unit to the grid of the triode ET1 forming part of a double triode. This triode is connected as a cathode follower and consequently negative impulses will be supplied in the time units corresponding to all free outlets, from the cathode circuit of this triode via wire V to the individual group selectors from where these impulses will be extended via contacts hm2 back, ga4 front, HB3 back, to wire d of the group selector which is extended in its turn to wire d of the register circuit. A negative impulse received on wire d at the register will be converted into a positive impulse by the tube AT and these positive impulses are applied through a rectifier to the grid circuit of the tube RT1 at the register. This tube operates as a comparator, the comparison being effected by means of a gate rectifier CTRC associated with a tube CT of which the grid, via break contact v21 is connected to one of the sources of impulses Pd1 ... 10, as determined by the registering means of any well-known type on which a numerical figure has been recorded and which has not been represented on the drawing. The impulses thus applied are in the positive direction.

When impulses arrive from the common control circuit of which the time does not coincide with the impulses supplied from the source Pd connected, these impulses will not be able to operate the comparator tube RT1. This will be the case when these impulses are sent under the control of an outlet which does not belong to the wanted group. When an impulse arrives from a free outlet of the wanted group, it will coincide with an impulse from the sources of impulses Pd connected at the register, and under these circumstances the tube RT1 will function and supply an impulse to the anode circuit of the pulse regenerator tube RT2. This tube, in conjunction with a transformer TP, TS will now supply a regenerated impulse the commencement of which is determined by the commencement of a very short impulse DI from a source DIS (Fig 2) which is applied to the grid circuit of tube RT1, in a cycle having a pulse in every Pa pulse time position, but at times slightly staggered behind the starting times of the Pa pulses.

When pulses via tubes AT and CT coincide with a pulse DI, tube RT1 operates and causes current to flow in the primary winding TP of the transformer TP, TS. The tube RT2 together with the transformer TP, TS connecting the grid and anode circuits and a varistor or thermistor VS in parallel on the grid and cathode polarisation circuits form an impulse generator. Current flow in the transformer primary TP causes flow of current in the secondary TS of the transformer, and renders the potential of the grid of the regenerator tubes RT2 more positive. If the amplitude of the potential applied is sufficient to bring the potential of the grid to a suitable value, taking the bias into account, the generator is started. The anode current begins to flow through the winding TP of the transformer, the grid then becoming more positive, thus causing a fresh increase of the anode current. The potential of the grid is very rapidly brought to a value higher than that of the cathode; a stronger grid current begins to flow, thus limiting any subsequent increase of the grid potential. At this moment, anode and grid currents begin to decrease, the latter decreasing more rapidly than the former, so that the difference between the ampere turns of the anode and grid windings increases rapidly.

After a certain time, which depends to a great extent on the self-inductance of the windings of the transformer and of the anode resistance of the tubes, the grid current is cancelled. From now on any reduction in the anode current causes, by induction, the appearance of a negative potential in the grid winding, which in turn causes another reduction of the anode current. The tube is thus rapidly de-energised and remains idle until the arrival of a fresh trigger impulse.

In this way, the appearance of an impulse of nearly rectangular form is produced, the amplitude and duration of which depend neither on the amplitude nor the form of the trigger impulse.

The loading resistance RRS, placed in the cathode circuit of the generator, makes it possible to transform the current impulse into a voltage impulse, said voltage being maintained at substantially the same value for the whole duration of the impulse.

One impulse will be generated for each trigger impulse applied to the anode, after which the tube returns to normal. The voltage impulse produced on the terminals of the cathode load resistance of RT2 is applied to the control electrodes of groups of cold cathode tubes Va1 ... 5, Vb1 ... 5, Vc1 ... 4, Vd.

The Va, Vb, Vc tubes are each controlled by a rectifier connected between the control electrode thereof and one of the time-pulse sources RaS, RbS, RcS, producing impulses Ra, Rb, Rc, acting in the positive direction, of which the impulse cycles have been shown in Fig. 8, said tubes being ionizable at specific times only. Thus, the tube Va1 is controlled by the impulses Ra1, the tube Va2 by the impulses Ra2 and so on, so that a tube such as Va1 can only be ionised in one of the time units in which the source RaS1 is transmitting an impulse Ra1, i. e. according to Fig. 8, in time units 1, 6, 11 etc.

Similarly, the tubes Vb1 ... 5 are each connected to one of the sources RbS1 ... 5, producing impulses Rb1 ... 5, through a rectifier, so that a tube such as Vb1, for example, can only be ionised during one of the groups of time units in which the source RbS1 is transmitting an impulse Rb1, viz in time units 1 ... 5, 26 ... 30, 51 ... 55, etc.

The tubes Vc1 ... 4 are also controlled by impulses Rc1 ... 4, of which the respective transmission time units may be found in Fig. 8.

Finally, there is a further last tube Vd which is not controlled by rectifiers, and thus can be ionised when it receives an impulse arriving in any time unit.

It is clear from the above that an impulse arriving in any time unit will always ionise one tube to each of the three groups Va, Vb, Vc, plus tube Vd. A combination of tubes, one from each group, is characteristic of each of the time units, and they hold in their anode-cathode circuits via the corresponding relays in the groups Aa ... Ae, Ba ... Be, Ca ... Cd to make contact b1 of normally energised relay B: battery B, dt1 back, v18 back earth.

Tube Vd acts by means of a rectifier DRC and a potentiometer DPT on the potential at the grid of a suppressor tube ST, which controls the cathode potential of tube RT1. As soon as tube Vd has ionised, the potential at the potentiometer is so changed that the grid potential of ST and thereby its cathode potential and that of tube RT1 are changed to a value at which RT1 is disabled from responding to further impulses. The cold cathode tubes will therefore be able to receive only a single impulse, indicating the first of the free outlets of the wanted group found by the explorer.

In series with tube Vd, relay F has operated and this at contact f2 short-circuits the winding of relay B. Relay B is is assumed to be operated from the moment the register was engaged and had prepared at its contact b1, a ground to the anode circuits of all cathode tubes. The short circuit by contact f2 does not take effect immediately, because B is made very slow to release under these conditions. At make contact f3 no action takes place. Make contact f1, however, closes a circuit for the test relay T to wire a, which, via the selector, is extended to wire VI of the common control circuit, to which wire battery potential is connected via 250W and break contacts gc1 and gf2. If the common control circuit is free, i. e. if it is not engaged by another register for effecting a connection on a multiselector, relay T at the register concerned will be able to energise to this test potential and by closing at contact t1 its low resistance winding in series with a winding of relay Dt, renders this test potential busy. Relay Dt now also operates and at break contact dt1 now fully opens the circuit of B, so that this releases quickly. As a consequence, ground is removed at b1 from the anode circuit of all cold cathode tubes, so that those tubes ionised and their relays are now able to hold in series with relay U via break ok7, and make contact dt6 to ground. As a consequence, relay U operates and in its turn at contact u1 energises relay V to the same ground. Relay V prepares a locking ground for itself and U via contacts u3 and v19, independent of contact dt6.

In the condition of the register circuit now described this is ready to transmit the indication of the identity of the outlet selected to the common control circuit. In the circuit in question this happens by using the same impulsing code as used for the exploration of the outlets, i. e. each outlet is represented by one time position in recurring cycles of 100 time positions. In order, therefore, to signal the outlets to be connected an impulse is to be transferred in a time position corresponding to the selected outlet number. This happens by means of a tube BT of which the grid circuit is controlled by three sets of gates, each gate comprising a rectifier and a contact of one of the recording relays and being connected to a corresponding pulse source. The first set of gates are connected via front contacts of the recording relays Aa to Ae to one of the sources Pa1 ... 5, the second set via front contacts of the recording relays Ba to Be to one of the sources Pb1 ... 5 and the third set via contact of the recording relays Ca to Cd to one of the sources Pc1 ... 4. The arrangement is such that only in one time position in which the pulses from all of the three sources connected coincide, the grid of tube BT will be rendered relatively positive, so that then its cathode will supply a positive impulse via back contact ok4 to wire c. Thus it will be seen that here the positive-going P pulses are used. This impulse is transmitted via wire c of the selector and contacts hb2 back, ga3 front, hm1 back, Fig. 4, to wire III of the common control circuit, which is connected again to three sets of cold cathode tubes VRA, VRB, VRC, arranged in a similar manner as those at the register circuit. As a consequence, one of each set of these tubes will ionise in accordance with the outlet to be connected and cause one of each of the three sets of anode relays to energise. The first two sets of these relays, Ara to Are and Bra to Bre serve to determine which of the 25 vertical magnets VM must be energised. One of these magnets is operated by a contact closed via a make contact of one of each of these two sets of relays in an obvious circuit as indicated in Fig. 5. The set of four relays Cra to Crd determines which of the servo magnets must operate in order to effect connection with the wanted outlet. As may be seen on the drawing the vertical servo magnet SVMA will energise when relay Cra or Crb has operated which corresponds with one of the first two rows of 25 outlets and SVMB will operate when either relay Crc or Crd, which each correspond to one of the two last rows of 25 outlets, has operated. The operating circuit for SVMA or SVMB is completed, as soon as one of the vertical magnets VM has energized, via a make contact *vm1* of one of these magnets and via a make contact *gd5* or *ge5* on one of two relays GD or GE. Relay GD is operated via make contact *cra2* or *crc2* for outlets 00 to 24 and 50 to 74, whereas GE energises for outlets 25 to 49 and 75 to 99 via front contacts *crb2* or *crd2*.

Meanwhile relay GF in the common control circuit has also operated by virtue of being connected via rectifiers in parallel with the cathode resistance of each of the three groups of cold cathode tubes. At make contact *gf1* this relay short-circuits the winding of relay GB which previously had operated from ground provided via break contact *hb1* and make contact *ga2* at the selector circuit, and which by its operation had provided on contact *gb1* a ground to the anode circuits of all cold cathode tubes VRA, VRB, VRC. The short-circuit of this relay by contact *gb1* does not immediately take effect, because GB is very slow to release under these conditions.

Break contact *gf2* opens the test potential to wire VI and by this causes the release of the test relays T and D*t* at the register circuit, thereby signalling to this circuit that the wanted outlet has been recorded in the common control circuit.

Release of relay D*t* Fig. 2 closes a circuit via break contact *dt3* and make contact *v16* for the operation of relay O*k* at the register, which locks itself to its own make contact *ok1* under the control of contact V*16*. Contacts *ok7* open the holding circuit in which the "outlet identity recording" relays Aa to Ae, Ba to Be and Ca to Cd together with relay U were held energised. These recording relays therefore release in readiness for receiving a next recording for the following selection. The release of U at contact *u3* opens the holding ground via *v19*, *v20*, for relay V, but this is a slow releasing relay and remains energised sufficiently long to permit relays T and D*t* to make another test. When relay O*k* operates, break contacts *ok5* open the ground wire *b* to relay GA, Fig. 4. Relay GA holds in series with magnet HM to ground provided to wire *e* from the cord circuit, Fig. 3. Both GA and HM hold in this circuit, HM changing over its contacts *hm1*, *hm2*, *hm3*. The test relay T is now connected via *u2* back, Fig. 2, *v17* front, wire *a*, Figs. 3 and 4, *hb4* back, *ga5* front, *hm3* front, wire VII, relay GC and one of contacts *gd3* or *ge3* to one of the vertical bar contacts VBA1, VBA2, VBB1 or VBB2. Each of the vertical bars, as explained above, is associated with two outlets, viz. one of the bars of a pair is associated with one of the outlets of rows 00 to 24 and 25 to 49, the other bar of each pair being associated with one of the outlets of rows 50 to 74 and 75 to 99. Depending on which of the relays Cra to Crd has energized, a circuit will now be established to only a single contact corresponding to one of the outlets. Assuming e. g. that one of the outlets in group 00 to 24 had been selected, relay Cra would have operated and caused the energisation of servo magnet SVMA which controls all vertical bars corresponding to outlets 00 to 49. At the same time Cra would have caused the operation of GD, so that of the two groups of 25 contacts associated with each of VBA1 and VBA2, of which one is closed by the combined action of VM and SVMA, only that of the first group, viz. 00 to 24, could be connected via contact *gd3*. Depending on which of the 25 vertical bars is energised, one of the outlets of this group of 25 will therefore be connected and the test circuit just referred to will be extended via the contact concerned to the test lead *e'* of this outlet. If this outlet is free, battery via 250W will be present on this test lead as explained before and the test relays T, D*t* at the register can now energise in turn. By doing so, they render this outlet immediately busy, i. e. not only is the direct current test potential so much reduced that no test relays of other registers may operate on this potential any more, but at the same time by the removal of the negative potential from the test lead, the explorer at the common control circuit will no longer be able to produce for this outlet a negative impulse.

Assuming that this test succeeds, relays T and D*t* operate a second time at the register and as already described above, D*t* recloses its contact *dt6* and reestablishes ground to relay V early enough to cause this to hold via its make contact *v20*. Relay U, however, remains de-energised.

Ground from make contact *ok4* is now extended via the *c* conductor, which at the selector circuit is extended via *hb2* back, *ga 3* front, *hm1* front, to wire II of the common control circuit, where it causes the operation via make contact *gd2* or *ge2* of one of the horizontal servo magnets SHMA or SHMB, according to whether relay GD or GE was energised. The horizontal servo magnet operated immedaitely closes a holding circuit for itself to its make contact *shma1* or *shmb1*, independent from its energising circuit from the register.

The operation of the horizontal servo magnet at the common control circuit causes the displacement of the horizontal bar of the individual selector for which magnet HM has already energised, and due to this the break contacts *hb1* . . . 4 controlled by the horizontal bar are opened, owing to which the individual selector circuit is now disconnected from the common control circuit.

The test potential which was provided from the test lead of the outlet selected is interrupted at break contact *hb4*, this test potential now being busied by the fact that ground is connected from the individual selector circuit to the test lead of the outlet via contact E and make contact *ga6*. The disconnection of free test potential from lead *a* causes the release of the test relays T and D*t* at the register. The opening of contacts *dt6* releases relay V, and with contacts *v17*, *f1*, and *dt4* open, relays D and D*t* are disconnected from wire *a*. The release of relay V also releases relay OK and ground is reconnected at *ok5* back to lead *b*, so that now via this wire the relay A in the next selector may be caused to operate.

It will be seen that the register is now again in the original condition, which was assumed to exist at the moment the selection described commenced.

In case it occurs that two or more registers, operating in conjunction with one common control circuit have tested on the same outlet simultaneously, these registers all try to operate their test relays T and D*t* immediately after the number of this outlet has been recorded at the register. As the test potential is given at the common control circuit via a resistance of 250*w*, only one of the pairs of relays at the registers concerned will be able to operate definitely on this test potential and this successful register will proceed with its operation as described above. Unsuccessful registers, of which the test relay D*t* does not operate will relapse to the condition in which free outlets of the wanted group are emplored in the following manner.

It has been seen that at the moment the identity of the outlet is recorded at the register by the operation of a combination of cold cathode tubes and their anode relays, relay F also energizes which at f2 short-circuits relay B. Even if the test relay Dt does not succeed in operating, relay B will finally be caused to release after some delay by being short-circuited at f2 and accordingly the cold cathode tubes are de-energised and their anode relays released, there being no holding circuit via the winding of relay U, because relay Dt had failed to operate and maintains the holding circuit open at make contact dt6. The record of the outlet tested has therefore been completely removed and after a while relay F releases, owing to the extinction of tube Vd, and B re-energises and re-establishes the selecting condition.

The case may occur that registers are connected to different common control circuits of which the multi-selectors have access to the same group of outlets or of which at least some of the outlets are provided in common for the two multi-switches concerned. In this case, when one outlet connected to two different multi-switches is seized simultaneously by two registers engaged with different common control circuits, these registers will each test, after having recorded the outlet identified, on a separate common control circuit and, therefore, will proceed with the operation of transferring the identity of the outlet selected each to their respective common control circuit in the manner described above. When at each of the two common control circuits concerned, the vertical bars are operated in consequence thereof, the first thing to happen is that the registers make a test on the test lead of the outlet. When this happens with two registers simultaneously, only one register will be able to energise its test relays on the test potential provided from the outlet and this will be able to proceed with the connection as described. The unsuccessful register of which the test relays did not succeed in operating when the outlet was tested, will now relapse again in the selecting condition in the following manner:

It will be seen that the test on the outlet commences after the release of relay U, which connects the test relays to wire a via break contact u2 and make contact v17. Relay U at the same time at make contact u3 opens one holding circuit for relay V. As described above, this relay normally is slow enough in releasing to remain operated until the test relays have re-energised, so that thereby Dt is able to reclose the other holding circuit of V at make contact dt6. In case, however, the test does not succeed, contacts dt6 do not close and accordingly relay V will release. Relay V immediately opens the circuit for the test relays at make contact v17 and also opens the holding circuit for relay OK at make contact v16. Relay OK by releasing now recloses ground to wire b at ok5 back, owing to which the horizontal magnet HM at the selector is again short-circuited via break contact HB5, so that the horizontal magnet releases and restores the selector to the condition in which it permits of hunting for a free outlet. At the same time, reclosure of break contact v18 at the register circuit connects earth via v18, dt1 back, to energise relay B and prepare the register for recording the identity of a free outlet found. All circuits are therefore again in the selecting condition.

In the circuits as described so far, the transfer of the identity of the outlet selected from the register to the ESBO circuit happens by means of a time-pulse cycle in which each time position identifies a different outlet.

As the transmission of outlet identification pulses from the common control circuit can continue without a break, the information to be conveyed from the register to the ESBO is limited to the identity of the outlet and there is no impulse suppressor in the common control circuit. This permits of a cheaper signalling method. As there is only a single wire available between the register and the ESBO for this purpose, a method has to be chosen, however, which permits of transferring this signal by a single wire in a rapid manner. One possible way of doing this has been illustrated in Fig. 6, which at its left-hand side shows a part of the register circuit and at its right-hand side a part of the common control circuit.

The part of the register circuit indicated refers particularly to the apparatus required for the transmission of the selected outlet's identity from the register to the control circuit. This apparatus is similar to that employed in Fig. 2, viz. it comprises a tube BT of which the cathode circuit is connected to the c wire and of which the grid circuit is connected to a number of impulse sources under the control of the outlet identity recording relays at the register. For the purpose of transfer now to be described, use is made of permutation code for which impulses Pa1 ... 6 are employed in different combinations. It will be assumed that six impulses Pa are provided instead of five, and therefore six tubes Va1 ... 6 and six relays Aa1 ... 6. Each Pb pulse now equals six Pa pulses instead of five, as in Fig. 8. The code employed has been shown in tables on Fig. 7. It will be seen that 1, 2 or 3 impulses Pa1 ... 6 produced by one or a combination of the sources Pas1 ... 6 may be sent consecutively via the c wire, and will cause thereby the operation of a corresponding number of cold cathode tubes VRA1 ... 6, VRB1, 2, at the common control circuit as well as their anode relays Ara/Arf, Bra, Brb.

In Fig. 6, these anode relays have been represented together with their contacts which are required to obtain the operation of the different selector magnets in the same manner as is indicated in Fig. 5. It will be seen that the control circuit now only comprises a total of 8 cold cathode tubes and 8 anode relays instead of 15 as in Fig. 5.

The transfer of a permutation code from the register to the selector control circuit happens as follows:

When the "outlet identity recording" relays Aa ... Af, Ba ... Be, Ca ... Cd at the register have operated, the cathode of tube BT is connected to the c wire, which via the selector individual circuit, not shown in Fig. 6, extends to the control electrodes of all cold cathode tubes VRA1 ... 6, VRB1, 2, in the common control circuit, Fig. 6.

A potential of −150 v. is connected via a resistance to the grid of tube BT, so that this, by virtue of being connected as a cathode follower, normally holds its cathode also at a potential near to −150 v.

The grid circuit is connected via two separating rectifiers LRC, RRC, to two gate circuits, each of which may independently provide a positive impulse to the grid.

The connection via the left-hand rectifier LRC is controlled in the first place by a group pulse gate GPGI which is connected to the source Pbl of impulses and which maintains this connection at −150 v., except during the time source Pbl provides a relatively positive impulse. The connection is further extended via a resistance R1 to a number of further separating rectifiers which, via contacts of the "outlet identity recording" relays Aa/Af, Ba/Be, Ca/Cd, in different combinations may be respectively connected to one of the sources of impulses Pal to Pa6. The arrangement is such that only when a positive impulse from one of the sources of impulses Pal to Pa6 coincides with a positive impulse Pbl the grid lead may assume a relatively positive potential. It may be seen namely that so long as Pbl is relatively negative, a positive impulse from any of the sources of impulses Pal to Pa6 will not affect the grid circuit, because the gate in series with Pbl is conductive and maintains a negative potential on the grid, the difference of potential prevailing between the grid lead and a positive potential from any of sources of impulses Pal to Pa6 being absorbed in R1.

When Pbl is relatively positive alone, without any of sources of impulses Pal to Pa6, the gate in series with Pbl is non-conductive and the grid is maintained negative by its grid resistance.

Therefore, depending on the combination of recording relays operated one or more impulses will be supplied in turn from one or more of the sources of impulses Pal to Pa6 during the period during which source Pbl of impulse is relatively positive.

These impulses are transmitted by BT via the c wire and cause the ionisation of a corresponding number of the cold cathode tubes of the set VRAI ... 6 in the common control circuit. These tubes are individually controlled by impulses Ral ... 6 respectively, and are also controlled as a group by a gate connected to the source of impulses Rbl, which at this time is relatively positive and renders the gate non-conductive, so that the pulses are not absorbed thereby.

Pulse potential during period Rbl is not able to ionise either of the set of tubes VRBI, 2, because these are controlled by a gate connected to the source of impulses Rb2, which during the period Rbl is negative, so that it maintains the control electrodes of tube Vbl, 2 negative.

The grid circuit of tube BT is further controlled via the right-hand rectifier RRC by a second gate, connected to the source Pb2 of impulses of which the impulse periods do not coincide with those of Pbl. Further this circuit is extended via resistance R2 and further contacts of the "outlet identity recording" relays to sources of impulses Pal and Pa2. In a similar way to that described above, positive impulses may be supplied via this circuit to the grid of BT when a positive impulse Pal or Pa2 coincides with a positive impulse Pb2.

Depending on the contacts on the recording relays closed, one, or both or none of the impulses Pal and Pa2 may be applied during the period in which Pb2 is relatively positive, when impulses do appear on the grid of BT, they are also transmitted to the common control circuit where they are able to ionise the tubes VRBI, 2, in a corresponding combination, without being able to affect the tubes VRAI ... 6, owing to the functions of the gates connected to sources of impulses Rb2 and Rbl respectively, which control these two sets of tubes.

The network of contacts of the recording relays shown fanning out from arfl are arranged so that each combination of pulses in period Rbl will cause the operation of a corresponding one of the twenty-six individual vertical magnets.

As an alternative to the arrangement shown in Fig. 6, it may be considered to convert the permutation code received on tubes Val ... 6 into an indication for operating one of the 26 vertical bars, not in an electrical manner but in a mechanical manner. This is, the selector in this case should not comprise 26 vertical magnets each controlling a pair of vertical bars as previously described, but there would be for example, six code bar magnets which act on an equal number of code bars that may be displaced in different combinations and thereby provide in a mechanical manner one of the 26 desired combinations for action on the vertical bars. In such a case it might be advantageous not to use a permutation code of six signals as illustrated in Figs. 6 and 7, but of five signals so as to reduce the number of code bars from 6 to 5, this being sufficient to select 26 different combinations.

In the embodiment described, the invention was applied to a system in which a register-controller has access to the selection stages both forward and backward solely via the cord-circuits and the conversational circuits to the respective common control or ESBO circuits in turn.

An alternative system is described in my copending application Serial No. 206,691, filed January 13, 1951, in which a register controller has direct and individual access via so-called ESBO connectors to the common control or ESBO circuits at the respective selection stages without passing over any part of the conversational connections.

The ESBO connectors provide sufficient parallel connecting leads between the register controller and an ESBO to allow of direct operation of the selector switch under control of the outlet-identity registering cold cathode tubes and relays in the register. This obviates the need for outlet-identity registering equipment in the ESBOS, and the need for outlet-identity signalling between register-controller and ESBO as in the embodiment described above.

While the principles of the invention have been described above in connection with specific embodiments, and particular modifications thereof, it is to be clearly understood that this description is made only by way of example and not as a limitation on the scope of the invention.

What I claim is:

1. An automatic telecommunication exchange comprising a pluraltiy of outlets, means for giving each free outlet an electrical characteristic, a plurality of individual selectors each having access to a group of said outlets, a register controller connected to said individual selectors, a common control circuit for said selectors connected to said selectors, gating means in said control circuit connected to said outlets and responsive to the electrical characteristic indicating the free condition of an outlet for producing a voltage impulse whose position in time is characteristic of said outlet, means for transmitting all such voltage impulses to said register controller, means in said register controller including a plurality of registering devices and a gating network connected thereto responsive to said time-positioned voltage impulses for registering in said devices the identity of the outlet characterized by the first of said received impulses, means controlled by said registering means for transmitting a signal characteristic of said outlet to said common control circuit, and means in said common control circuit responsive to said signal for connecting said selector to said outlet.

2. An automatic telecommunication exchange, as claimed in claim 1, in which the means in the common control circuit for connecting the selector to the outlet comprises means for registering the identity of said outlet in response to the received signal, and means for setting the selector under control of said last-mentioned registering means.

3. An automatic telecommunication exchange, as claimed in claim 2, further comprising means in the register controller under control of the means for setting the selector for making a second test to determine the free condition of the outlet selected, and means in the register controller under control of said second test means for releasing said selector if said second test is not successful.

4. An automatic telecommunication exchange, as claimed in claim 1, further comprising means under control of the means for connecting the selector to the selected outlet for releasing the register controller when the selector had been connected to the outlet.

5. An automatic telecommunication exchange, as claimed in claim 4, further comprising means under control of the means for connecting the selector to the selected outlet for disconnecting the common control circuit from said selector.

6. An automatic telecommunication exchange, as claimed in claim 1, in which the means in the control circuit responsive to the free condition of an outlet for producing a voltage impulse whose position in time is characteristic of said outlet comprises a plurality of voltage impulse sources, each source producing a train of impulses having a position in time different from that of the impulses produced by every other source, a common return connection for said sources, a resistor having one end connected to said common return connection, a plurality of branch circuits each connected between the other end of said resistor and one of the outlets, a source of voltage at each outlet, means for connecting said source between said outlet and said common return connection when said outlet is free, whereby a current will normally flow through said resistor and a branch circuit connected to a free outlet, a first rectifier connected in each branch circuit adjacent said resistor and poled so as to permit said current to flow, a second rectifier connected to each branch circuit, means for connecting a different pulse-train source to each second rectifier, the polarity of said voltage source, said voltage impulse trains, and said second rectifiers, being such that current is prevented from flowing through a branch circuit leading to a free outlet whenever a voltage impulse is applied to the second rectifier connected to said branch circuit, whereby the voltage of the junction of said resistor and said branch circuit is changed at the time of the impulse applied to said second rectifier, and means for transmitting the change in voltage so produced to the register controller.

7. An automatic telecommunication exchange, as claimed in claim 6, in which the outlets are divided into groups and further comprising a second group of repetitive voltage impulse sources connected to the common return connection, the impulses of each source in said second group having a position in time different from those of every other source and a duration equal to the repetition period of the impulse of the first group of sources, a plurality of second branch circuits, each connected between the resistor and a group of the first-mentioned branch circuits, a rectifier included in each of said second branch circuits, poled so as to permit current to flow through said resistor to the source of voltage at a free outlet, a rectifier connected to each second branch circuit, and means for connecting one of said second group of impulse sources to each of said last-mentioned rectifiers, said sources and said last-mentioned rectifiers being so poled that when an impulse is applied to a rectifier the current will be blocked from flowing through said resistor, the means in said register controller for responding to the voltage impulse transmitted from said common control circuit comprising a coincident circuit having two inputs, means for selectively applying the voltage impulses from one of said second group of sources to one of said input circuits, and means for applying the voltage impulses received from said common control circuit to the other of said input circuits, whereby an output of said coincidence circuit will only be produced when the impulses coincide and a free outlet in any group may thus be selected.

8. An automatic telecommunication exchange, as claimed in claim 7, in which the means in the common control circuit for connecting the selector to the outlet comprises means for registering the identity of said outlet in response to the received signal and means for setting the selector under control of said last-mentioned registering means.

9. An automatic telecommunication exchange, as claimed in claim 8, further comprising means in the register controller under control of the means for setting the selector for making a second test to determine the free condition of the outlet selected, and means in said register controller under control of said second test means for releasing said selector if said second test is not successful.

10. An automatic telecommunication exchange, as claimed in claim 1, in which the means for transmitting a signal from the register controller to the common control circuit comprises means controlled by the registering means for transmitting a voltage impulse at the same time position as that received by said register controller from said common control circuit, and in which the means in said common control circuit responsive to said signal comprises means for registering the identity of the free outlet in accordance with the time positioned voltage impulse so received.

11. An automatic telecommunication exchange, as claimed in claim 1, in which the means for transmitting a signal from the register controller to the common control circuit comprises means controlled by the registering means for transmitting a voltage impulse having an arbitrary time relation to the time of the voltage impulse received from said common control circuit, and in which the means in said common control circuit responsive to said signal comprises means for registering the identity of the free outlet in accordance with the time positioned voltage impulse so received.

12. An automatic telecommunication exchange, as claimed in claim 1, in which there are a plurality of register controllers and a plurality of common control circuits, each common control circuit being available to each register controller, further comprising means in each register controller for testing whether a common control circuit is in use, and means in each common control circuit for rendering it busy to said test means when it is in use for controlling the setting of a selector.

References Cited in the file of this patent

UNITED STATES PATENTS

| Number | Name | Date |
|---|---|---|
| 1,757,446 | Wright | May 6, 1930 |
| 2,454,809 | Kruithof | Nov. 30, 1948 |